Aug. 17, 1948.  J. K. OSTRANDER  2,447,087
LIQUID RHEOSTAT
Filed June 27, 1946  2 Sheets-Sheet 1
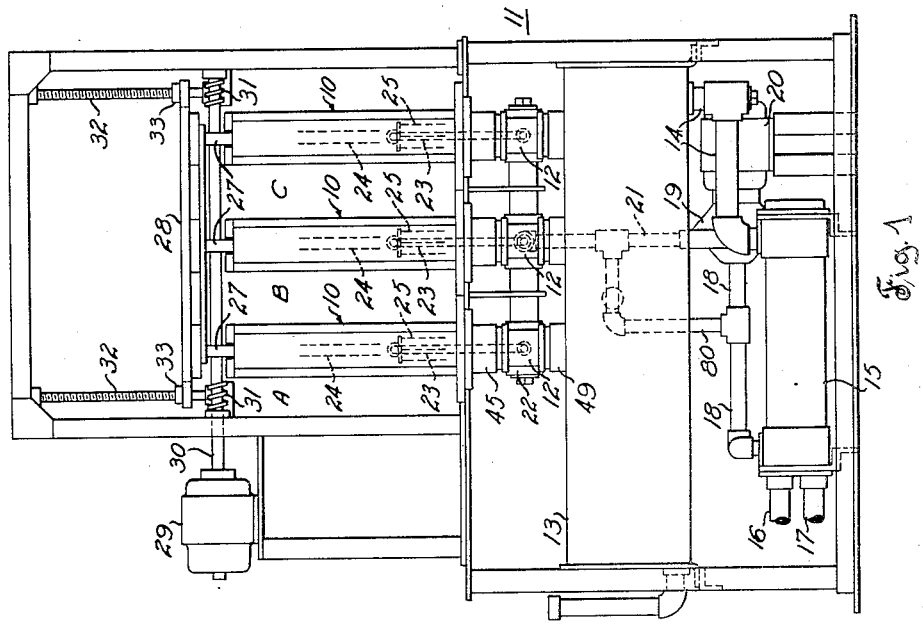
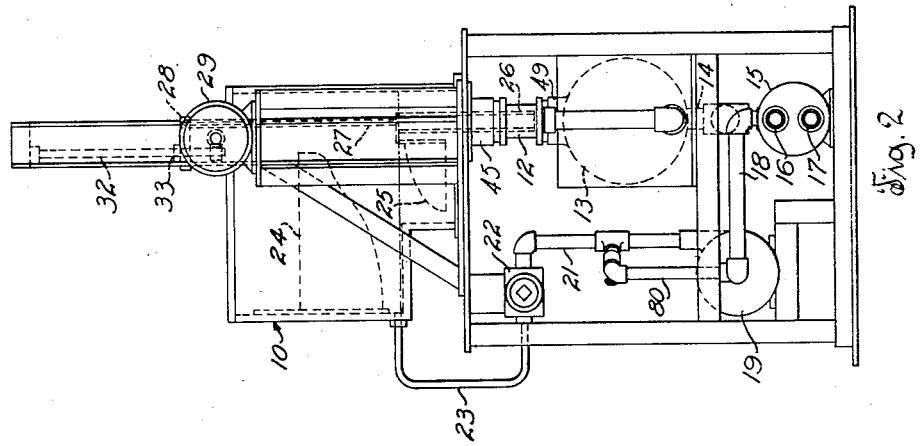
INVENTOR
John K. Ostrander
BY
Harold A. Silver
ATTORNEY Aug. 17, 1948.  J. K. OSTRANDER  2,447,087
LIQUID RHEOSTAT
Filed June 27, 1946  2 Sheets-Sheet 2
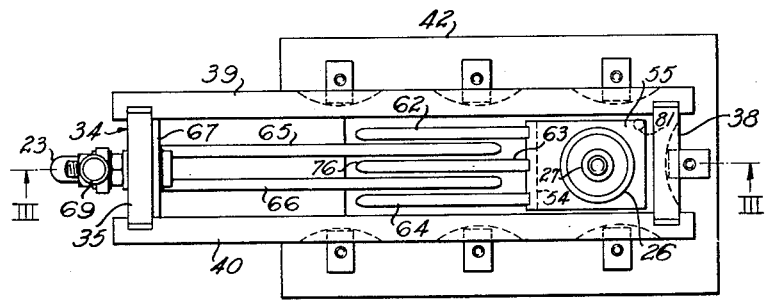
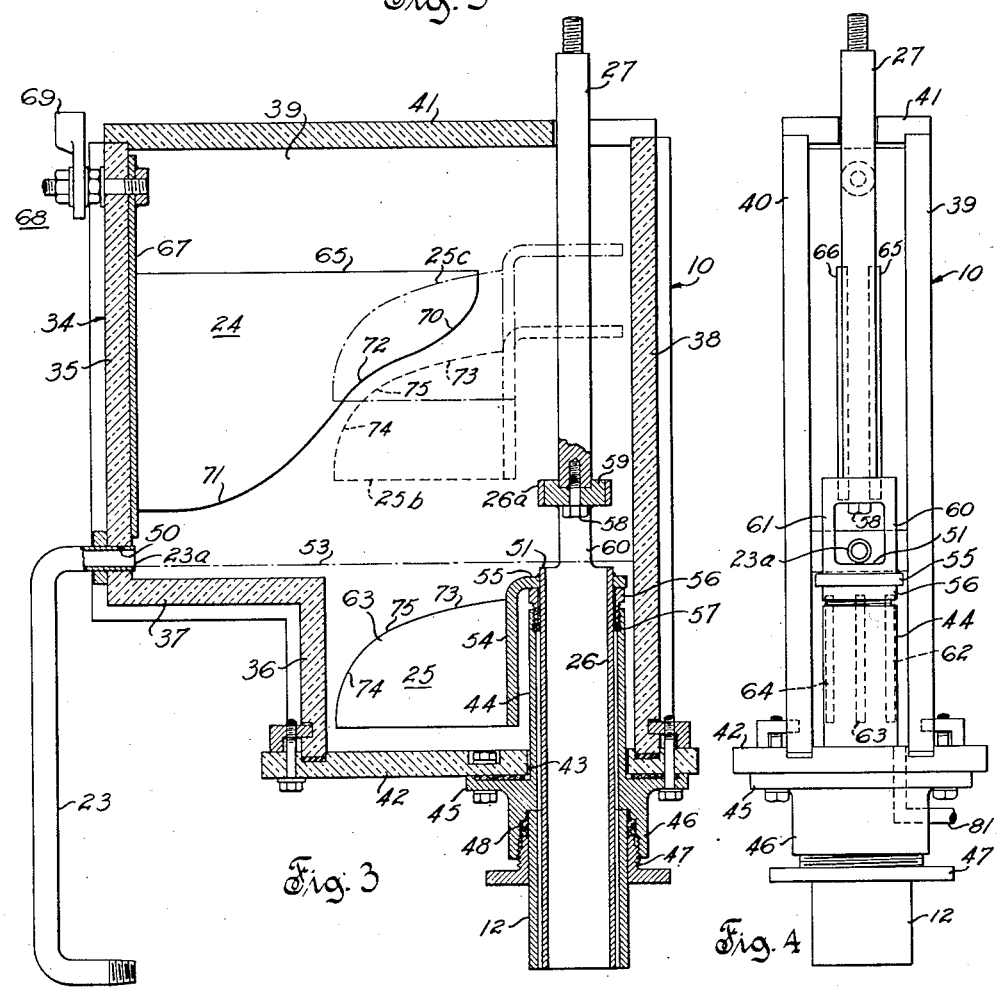
INVENTOR
John K. Ostrander
BY
Harold A. Silver
ATTORNEY Patented Aug. 17, 1948

2,447,087

UNITED STATES PATENT OFFICE 2,447,087

LIQUID RHEOSTAT

John K. Ostrander, Philadelphia, Pa.

Application June 27, 1946, Serial No. 679,621

12 Claims. (Cl. 201—57)

This invention relates to liquid rheostats and the principal object of the invention is to provide new and improved rheostats of this type.

Another object is the provision of a large range of resistance in a liquid rheostat. When, for example, the liquid rheostat constitutes a slip regulator, to control the current in the secondary of a polyphase motor, the large resistance range provides a larger motor speed range. A more specific object is to provide a liquid rheostat in which the movement of the electrodes for obtaining the desired resistance range is relatively small.

Another object is to provide a liquid rheostat in which the change in resistance for a given movement of the electrodes is not materially different for different positions of the electrodes.

Another object is to provide a liquid rheostat in which there is ample space between the electrodes at all positions, and the direction of flow of electrolyte does not change when the electrolyte passes between the electrodes.

Another object is to provide a construction in which a maximum amount of the electrolyte in the rheostat is in the electric circuit for all positions of the electrodes, so that the necessary quantity of electrolyte is reduced and as a result the apparatus may be smaller.

In prior types of liquid rheostats of the variable liquid level type, close proximity of electrode portions extending into the liquid from above the level thereof may cause boiling, fuming, and the like, which may result in arcing and short circuits. It is an object of the invention to provide a liquid rheostat in which this objection is avoided.

A more specific object is to provide a liquid rheostat in which one electrode is always below the liquid level, and more specifically, in which both the liquid level may be varied and the distance between the electrodes varied.

Other objects will appear as the description of the invention proceeds.

The novel features of the invention and how the objects are attained will appear from this specification and the accompanying drawings showing one embodiment of the invention and forming a part of this application, and all these novel features are intended to be pointed out in the claims.

In the drawings, Fig. 1 is a front elevation of apparatus comprising a liquid rheostat embodying the invention, especially adapted for use as a slip regulator;

Fig. 2 is a side elevation of the apparatus shown in Fig. 1;

Fig. 3 is a section, taken on the line III—III of Fig. 5, looking in the direction of the arrows, of an element of the liquid rheostat shown in Figs. 1 and 2;

Fig. 4 is a front elevation of the rheostat element shown in Fig. 3, the front plate of the receptacle for the liquid being removed; and Fig. 5 is a plan view of the rheostat element shown in Fig. 3, the top of the receptacle being removed.

Referring first to Figs. 1 and 2, the liquid rheostat there shown, embodied as a slip regulator, includes three elements A, B, C each of which comprises a cell or receptacle 10 for containing electrolyte constituting liquid resistance material between the electrode means contained in the receptacles as will appear. The receptacles 10 are supported in any suitable way, as on a framework 11.

Means is provided whereby the liquid for the rheostat is circulated, being discharged from the receptacle 10, cooled, and returned to the receptacles. Each receptacle 10 is provided with a discharge pipe 12 connected at the top to the receptacle 10, as will more fully appear, and connected at the bottom to a liquid reservoir 13.

Liquid is discharged from the reservoir 13 through a pipe connection 14 to a heat exchanger 15, which may be of any suitable form, for cooling the liquid. Connections 16, 17 are for admitting and discharging cooling fluid for the heat exchanger 15. Liquid is discharged from the heat exchanger 15 through a pipe 18 connected to the inlet of a pump 19 driven by an electric motor 20. The pump 19 discharges liquid through a pipe 21 to a header 22. If desired, a valved bypass 80, for bypassing the pump 19, may be provided. To the header 22 are connected liquid supply pipes 23, one for each receptacle 10, as will more fully appear.

Each receptacle 10 contains relatively stationary electrode means 24 and relatively movable electrode means 25. The electrode means 25 is carried by a weir 26 in turn carried by a rod 27. The rods 27 are carried by a horizontal bar 28 and are electrically connected. The bar 28 may be raised and lowered by operation of an electric motor 29 which drives a horizontal shaft 30 carrying worms 31 cooperating with worm gears respectively mounted on vertical shafts 32. Rotation of shafts 32 causes threads thereon cooperating with nuts 33 on the bar 28 to raise or lower the bar.

Referring now more particularly to Figs. 3, 4 and 5, these figures show one of the elements such as A, B or C of Figs. 1 and 2. The receptacle 10 is here shown as including a rear wall 34 comprising a vertical upper portion 35, and a vertical lower portion 36 offset frontwardly from the vertical portion 35 and joined thereto by a horizontal portion 37. The receptacle 10 further includes a front wall 38, side walls 39, 40, a cover 41 and a bottom wall 42. The back, front, side and bottom walls of the receptacle 10 are securely fastened together, liquid tight, in any suitable way. A drain pipe 81, having a valve (not shown) may be provided for draining the liquid from the receptacle 10. The cover 41, which has an opening to permit passage of rod 27, may merely rest on the upper margin of the receptacle. The receptacle 10 may be made of any suitable electrical insulating material.

The bottom wall 42 has a hole 43 through which extends a stand pipe 44 provided with a flange 45 fastened to and held water tight against the under side of the bottom wall 42. The discharge pipe 12 fits in a stuffing box 46 extending downwardly from the flange 45. A gland 47 and packing 48 are provided to make the joint between the pipe 12 and stuffing box 46 liquid tight. The lower end of the pipe 12 is connected by a stuffing box and gland 49 to the reservoir 13.

The upper discharge end 23a of the pipe 23 fits through an inlet opening 50 in the wall 35, the opening 50 being here shown as just above the horizontal wall 37. Liquid is pumped into the receptacle 10 through the pipe 23 and the level of the liquid in the receptacle will depend on the position of the discharge margin 51 of the weir 26 here shown of tubular form. The weir 26 is shown as in its lowest position, the lowest liquid level being indicated by the dot-and-dash line 53. It will be understood that as liquid is pumped through the pipe 23 into the receptacle 10 it is being discharged over the margin 51 into the weir 26 and thence into the reservoir 13.

The weir 26 carries the movable electrode means 25 by means of a bracket including a vertical plate 54 having a portion 55 bent to the horizontal and provided with a hole through which the weir tube 26 extends. The bracket portion 55 is welded or otherwise suitably fastened to the weir tube 26 near the margin 51. The underside of the bracket portion 55 engages, in its lowest position, the upper end of a bushing 56 threaded into cooperating internal threads in the upper end of the stand pipe 44 and engaging packing 57 in turn engaging the outside of the weir tube 26, so that liquid will not be discharged down between the upper end of the stand pipe and the outside of the weir tube. The packing 57 of course permits vertical movement of the weir tube 26.

The lower end of the rod 27 is here shown as fastened by a screw 58 to a member 59 welded or otherwise suitably fastened in the upper end 26a of the weir tube 26. Two or more windows are cut into the upper end of the weir tube 26, leaving two or more portions 60, 61 of the tube connecting the principal portion of the tube and the rod 27, and providing the overflow margin 51. It will be evident that other forms of connecting means may be utilized.

The movable electrode means 25 comprises, as here shown, three spaced plates 62, 63, 64 disposed in parallel vertical planes. The plates 62, 63, 64 are cooperable with plates comprising the relatively stationary electrode means 24, these plates being here shown as two in number 65, 66, disposed in parallel vertical planes. The plates 65, 66 are welded or otherwise suitably fastened to a plate 67 supported in any suitable way against the wall 35. The plate 67 may be held against the wall 35 by connecting means 68 including a threaded stud and nuts, also serving to hold a connection terminal 69 to which a lead from a controlled motor may be connected. It will be understood that there is a connection terminal 69 for each of the elements A, B and C.

The plates of the relatively stationary electrode means 24 and the relatively movable electrode means 25 are of generally triangular shape, the plates of the means 25 being of materially smaller area than those of the means 24. The construction and arrangement is such that the plates of the respective electrode means are interleaved when the rod 27 is raised a predetermined amount. The free apexes of the plates of the means 24 are directed toward the right, as viewed in Fig. 3, whereas the free apexes of the plates of the means 25 are directed toward the left. The margins of the plates of the means 24, nearest to the means 25, extend downwardly at an angle to the vertical. These margins have a convex part 70 at the under side of the free apex, and a convex part 71 at the lowermost end. Between the parts 70 and 71, a part 72 of the margin is concave. The margins of the plates of the means 25, nearest to the means 24 also extend downwardly at an angle to the vertical. These margins are convex and have an uppermost part 73 of relatively large radius of curvature gradually joining a part 74 of relatively small radius of curvature. The margin part 75, between the ends of the parts 73 and 74, and the margin part 72 are made substantially complementary, so that especially when the margin parts 72, 75 are in proximity, they are collateral. As may be seen from the dotted line position 25b of the electrode means 25, the margin part 75, which is a large fraction of the total upper marginal length of the plate, is equidistantly spaced from the adjacent margin part 72.

In order to minimize possible turbulence of the liquid flowing toward or away from a margin of an electrode plate, the corners at the margins are desirably rounded as shown at 76 (Fig. 5).

The operation of the rheostat element shown in Figs. 3, 4 and 5 is as follows: Assuming that the parts are in the position shown in the drawings, and that the rod 27 is moved upward, thereby moving the weir 26 upward, the overflow margin 51 of the weir will determine the liquid level in the receptacle 10, and as the weir rises, the liquid will immerse first the lowermost portions of the plates 65, 66, providing a path of high resistance between the electrode means 24 and 25, then will immerse more and more of the plates 65, 66 providing a path of lower and lower resistance, until the weir 26 assumes its uppermost position 25c in which the plates 65, 66 are completely immersed and the plates 65, 66 are interleaved with the plates 62, 63 and 64, whereby a path of minimum resistance is provided between the electrode means 24 and 25.

It may be noted that when the electrode means 25 is in position 25c, the area of overlap of two adjacent plates, as 64, 66 for example, is a materially larger fraction of the area of plate 64 than of the area of plate 66.

It will be apparent that the electrode means 25 is always submerged under the liquid level regardless of the position of the weir 26, and as the electrode means 25 approaches the electrode means 24 there will be no undesired concentration of electric current flow, even when the means 25 is in close proximity to the means 24, as in the position 25b, and is about to become interleaved with the means 24. Furthermore, with respect to any pair of plates where current flow takes place from one plate to the other, at no time will both plates of the pair have portions above the liquid level, thereby avoiding objectionable boiling and fuming, and possible arcing and short circuiting.

As the weir 26 rises, the flow of liquid from the inlet opening 50 proceeds between the electrode means 24 and 25 to the overflow magin 51 into the weir 26. The path of flow of the liquid is an unobstructed direct path, even when the plates of the means 24 and 25 are interleaved. It will be noted that as the weir 26 and electrode means 25 rise, especially into the intermediate and higher positions, the flow of liquid from the inlet 50 to the overflow 51 is in the general plane of the plates of the means 24 and 25 and between the plates of each of the means 24 and 25. In the highest positions of the means 25 the flow of liquid is in the general plane of the plates between the overlapping surfaces of adjacent plates of the means 24 and 25. And in all of the foregoing conditions the liquid flow is unobstructed and direct from the inlet 50 to the discharge at the margin 51 of the weir 26. The construction and arrangement is therefore such that the current distribution over the elctrode means is improved so that parts of the conducting path do not become overheated and there are no hot spots such as occur when there is a change in direction of liquid flow between the electrode means.

From the foregoing it will be apparent to those skilled in the art that the illustrated embodiment of the invention provides a new and improved liquid rheostat and accordingly accomplishes the objects of the invention. On the other hand, it will also be obvious to those skilled in the art that the illustrated embodiment of the invention may be variously changed and modified, or features thereof singly or collectively, embodied in other combinations than those illustrated without departing from the spirit of the invention, or sacrificing all of the advantages thereof, and that, accordingly, the disclosed embodiment is illustrative only, and the invention is not limited thereto.

It is claimed and desired to secure by Letters Patent:

1. A liquid rheostat, comprising: a receptacle for containing liquid; a plurality of electrode means in said receptacle; means for varying the total area of said electrode means immersed in said liquid to vary the resistance to flow of electric current from one of said electrode means to the other; and one of said electrode means being so constructed and arranged that it is always entirely below the level of said liquid.

2. A liquid rheostat, comprising: a receptacle for containing liquid; a plurality of electrode means in said receptacle; means for varying the total area of said electrode means immersed in said liquid to vary the resistance to flow of electric current from one of said electrode means to the other; means for varying the distance between said electrode means; and one of said electrode means being so constructed and arranged that it is always entirely below the level of said liquid.

3. A liquid rheostat, comprising: a receptacle for containing liquid; a plurality of relatively movable electrode means in said receptacle; means for varying the total area of said electrode means immersed in said liquid to vary the resistance to flow of electric current from one of said electrode means to the other; and means for varying the relation of said relatively movable electrode means from a position in which said electrode means are completely spaced from each other to a position in which they overlap each other at least in part.

4. A liquid rheostat, comprising: a receptacle for containing liquid; a plurality of electrode means in said receptacle; means, including an adjustable weir, constructed and arranged to vary the total area of said electrode means immersed in said liquid to vary the resistance to flow of electric current from one of said electrode means to the other; one of said electrode means being mounted for movement in unison with said weir.

5. A liquid rheostat, comprising: a receptacle for containing liquid; a plurality of relatively movable electrode means in said receptacle, said relatively movable electrode means being so constructed and arranged that in a low resistance position said relatively movable electrode means overlap each other; means, for causing a flow of liquid in said receptacle, including liquid inlet means and liquid discharge means; and said plurality of electrode means and said liquid flow causing means being relatively so constructed and arranged that the liquid flow takes place in an unobstructed substantially direct path from said inlet means and between said overlapping electrode means to said discharge means.

6. A liquid rheostat, comprising: a receptacle for containing liquid; relatively stationary electrode means in said receptacle; relatively movable electrode means in said receptacle, constructed and arranged for movement in a predetermined direction; and the margins of said relatively stationary and movable electrode means nearest to each other being at an angle to said direction.

7. A liquid rheostat, comprising: a receptacle for containing liquid; relatively stationary electrode means including a plane plate in said receptacle; relatively movable electrode means including a plane plate in said receptacle, constructed and arranged for movement in a predetermined direction; and the margins of said relatively stationary and movable plates nearest to each other being at an angle to said direction, said margins being curved and collateral to each other, and the collateral portion of the plate of said movable electrode means constituting a relatively large fraction of the margin of said plate.

8. A liquid rheostat, comprising: a receptacle for containing liquid; relatively stationary electrode means including a plane plate in said receptacle; relatively movable electrode means including a plane plate in said receptacle, constructed and arranged for movement in a predetermined direction; and the margins of said relatively stationary and movable plates nearest to each other being at an angle to said direction, said margins being collateral to each other.

9. A liquid rheostat, comprising: a receptacle for containing liquid; relatively stationary electrode means, including a first plate; relatively movable electrode means, including a second plate in said receptacle, constructed and arranged to be moved upwardly from a high resistance position in which said second plate is completely spaced from said first plate to a low resistance position in which said second plate, at the uppermost part of its movement, overlaps said first plate in laterally spaced relation.

10. A liquid rheostat, comprising: a receptacle for containing liquid; relatively stationary electrode means, including a first plate, in said receptacle; relatively movable electrode means, including a second plate in said receptacle, constructed and arranged to be moved from a high resistance position in which said second plate is completely spaced from said first plate to a low resistance position in which said second plate overlaps said first plate in laterally spaced relation and in which the area of mutual overlap of said plates is a materially larger fraction of the area of said second plate than of said first plate.

11. A liquid rheostat, comprising: a receptacle for containing liquid; relatively stationary electrode means, including a first plate of generally triangular shape; relatively movable electrode means, including a second plate in said receptacle, constructed and arranged to be moved from a high resistance position in which said second plate is completely spaced from said first plate to a low resistance position in which said second plate overlaps an apex portion of said said first plate in laterally spaced relation.

12. A liquid rheostat for a polyphase circuit, comprising: a plurality of separate receptacles for containing liquid, one receptacle for each phase of the polyphase circuit; a plurality of relatively stationary electrode means, in said receptacles respectively, constructed and arranged for connection to the respective phases of said polyphase circuit; a plurality of relatively movable electrode means in said receptacles cooperable with said relatively stationary electrode means respectively; means for varying the total area of immersion of the electrode means in each receptacle; and means electrically connecting said plurality of relatively movable electrode means.

JOHN K. OSTRANDER.

REFERENCES CITED

The following references are of record in the file of this patent:

UNITED STATES PATENTS

| Number | Name | Date |
|---|---|---|
| 1,253,235 | Hall | Jan. 15, 1918 |
| 1,340,241 | Nicht | May 18, 1920 |
| 1,433,646 | Petty | Oct. 31, 1922 |
| 1,590,509 | Hibbard | June 29, 1926 |